3,290,321
PROCESS FOR THE PREPARATION OF 2:2'-DIPYRIDYLS
George Henry Lang, Manchester, England, assignor to Imperial Chemical Industries Limited, London, England, a corporation of Great Britain
No Drawing. Filed June 5, 1964, Ser. No. 373,112
Claims priority, application Great Britain, June 19, 1963, 24,466/63
10 Claims. (Cl. 260—296)

This invention relates to a new process for the manufacture of 2:2'-dipyridyls from pyridine or alkyl pyridines.

2:2'-dipyridyl and certain of its alkyl derivatives are valuable intermediates for the preparation of herbicides and may be prepared by the action of noble metal or rhenium catalysts on pyridine or the appropriate alkylpyridine at elevated temperatures.

It has now been found that pyridine oxide or an alkyl pyridine oxide may be used instead of pyridine or the corresponding alkylpyridine and affords enhanced yields of dipyridyls.

According to the invention therefore there is provided an improved process for the manufacture of 2:2'-dipyridyl and alkyl derivatives thereof which comprises heating pyridine oxide or an alkylpyridine oxide at a temperature above 150° C. with a noble metal or rhenium catalyst.

As alkylpyridine oxides which may be used in the process of our invention there may be mentioned for example the oxide of any pyridine carrying a lower alkyl group, by which is meant an alkyl group containing not more than six carbon atoms. Two alkyl groups may be present but the groups must not be in both the 2 and 6 positions of the pyridine ring and should not contain altogether more than six carbon atoms. As examples of such alkylpyridine oxides there may be mentioned 3-methyl and 4-methylpyridine oxides which afford respectively 5:5'-dimethyl and 4:4'-dimethyl-2:2'-dipyridyls.

As noble metals there may be mentioned platinum, palladium, ruthenium, osmium, iridium, rhodium. The catalyst may be prepared from these metals or their salts by well-known methods. It is preferred that the metal be supported on a carrier such as alumina, silica, animal charcoal, asbestos, pumice or kieselguhr. The catalyst may be in powder or granular form.

The pyridine oxide or alkylpyridine oxide may be used alone or in admixture with pyridine or the corresponding alkyl pyridine. This latter process affords higher yields of dipyridyls than if pyridine or the alkylpyridine is used in absence of any oxide. A convenient procedure is to prepare the pyridine oxide or alkylpyridine oxide in situ by adding hydrogen peroxide to the pyridine or alkylpyridine before heating wit hthe catalyst.

The amount of catalyst used influences the rate of reaction. It is preferred to use a quantity of catalyst which, together with any supporting materials, is between 1 and 50% of the weight of pyridine oxide or alkylpyridine oxide together with that of the pyridine or alkylpyridine if used.

The preferred temperatures for carrying out the process of the invention are between 250 and 450° C. Temperatures below this range, for example between 150 and 250° C. can be used but give low speeds of conversion, and higher temperatures lead to side reactions.

The process may be carried out by heating the catalyst and pyridine oxide to the desired temperature in an agitated, enclosed vessel capable of withstanding the high pressure produced.

The optimum time of reaction varies with the temperature used and the pyridine. Using pyridine oxide little further reaction takes place after about 10 hours at 300° C. After reaction the catalyst is removed, for example, by filtration before isolation of the dipyridyl.

If desired the process can be carried out in a continuous manner for example by circulation continuously over the catalyst of a mixture of pyridine and its oxide recovered by distillation from the dipyridyls accumulating in a vessel separate from that containing the catalyst. By adjustment of pressure the catalyst can be operated under vapour or liquid phase conditions.

The invention is illustrated but not limited by the following examples in which all parts and percentages are by wieght unless otherwise stated—

Example 1

0.5 part of a catalyst consisting of 1% platinum on animal charcoal is heated in a sealed glass tube with 10 parts of pyridine-N-oxide at a temperature of 300° C. for 10 hours. After cooling the catalyst is removed by filtration to give a product containing 0.094 part of 2:2'-dipyridyl corresponding to a rate of production of 188 parts of 2:2'-dipyridyl per hour per 100 parts of platinum.

Example 2

The procedure of Example 1 is repeated using 0.5 part of a 1% platinum on alumina as catalyst. The yield of 2:2'-dipyridyl is 0.098 part corresponding to a rate of production of 196 parts per hour per 100 parts of platinum.

Example 3

The procedure of Example 1 is repeated using 0.5 part of 1% palladium on alumina as catalyst. The yield of 2:2'-dipyridyl is 0.1075 part corresponding to a rate of production of 215 parts per hour per 100 parts of palladium.

Example 4

The procedure of Example 1 is repeated using 0.5 part of 5% rhodium on alumina as catalyst and at a temperature of 250° C. for 10 hours. The yield of 2:2'-dipyridyl is 0.05 part equivalent to a rate of production of 20 parts per hour per 100 parts of rhodium.

Example 5

0.5 part of a catalyst consisting of 1% platinum on alumina is heated in a sealed glass pressure tube at a temperature of 300° C. for 10 hours with 25 parts of a mixture containing pyridine and pyridine-N-oxide in the ratio of 95:5 respectively. After cooling, the catalyst is removed by filtration to give a solution containing 0.102 part of 2:2'-dipyridyl corresponding to a rate of production of 204 parts per hour per 100 parts of platinum.

A similar experiment carried out in this way but omitting the pyridine-N-oxide gives a rate of production of 148 parts of 2:2'-dipyridyl per hour per 100 parts of platinum, showing the enchancement of the reaction by the pyridine-N-oxide.

Example 6

Proceeding as described in Example 5 but using 1% palladium on alumina as catalyst the rate of production of 2:2'-dipyridyl observed is 237 parts per hour per 100 parts palladium whereas a similar experiment in which the pyridine-N-oxide is omitted gives only 52 parts per hour per 100 parts of palladium.

Example 7

0.5 part of a catalyst consisting of 1% palladium on alumina catalyst is heated in a sealed glass pressure tube with a mixture of 25 parts of pyridine and 2 parts of commercial 100 volume hydrogen peroxide solution at a temperature of 300° C. for 10 hours. After cooling the catalyst is filtered off, to give a solution containing 0.132 part of 2:2'-dipyridyl corresponding to a rate of production of 264 parts of 2:2'-dipyridyl per hour per 100 parts of palladium. A similar experiment carried out in absence of the hydrogen peroxide gives a rate of production of only 52 parts per hour per 100 parts of palladium.

What I claim is:

1. An improved process for the manufacture of 2:2'-dipyridyl and alkyl derivatives thereof which comprises heating pyridine oxide or an alkylpyridine oxide at a temperature above 150° C. with a noble metal or rhenium catalyst.

2. A process as claimed in claim 1 in which there is also present the corresponding pyridine or alkylpyridine.

3. A process as claimed in claim 1 wherein the alkylpyridine oxide is 3-methyl or 4-methylpyridine oxide.

4. A process as claimed in claim 1 wherein pyridine oxide or alkylpyridine oxide is prepared by adding hydrogen peroxide to the pyridine or alkylpyridine.

5. A process as claimed in claim 1 wherein the amount of catalyst together with any supporting material is between 1 and 50% of the weight of pyridine or alkylpyridine itself and as oxide.

6. A process as claimed in claim 1 wherein the heating is carried out at a temperature between 250° and 450° C.

7. A process as claimed in claim 1 wherein the process is carried out in the liquid phase.

8. A process as claimed in claim 1 wherein the process is carried out in the vapour phase.

9. A process for the manufacture of 2:2'-dipyridyl which comprises heating a mixture of pyridine and pyridine-N-oxide at a temperature between 250° and 450° C. in the presence of a catalyst consisting essentially of platinum, rhodium or palladium on alumina.

10. The process of claim 9 wherein the pyridine-N-oxide is formed in situ by adding hydrogen peroxide to the pyridine before heating in the presence of said catalyst.

References Cited by the Examiner

UNITED STATES PATENTS

| | | | |
|---|---|---|---|
| 3,164,599 | 1/1965 | Rapoport | 260—296 |
| 3,173,920 | 3/1965 | Lang | 260—296 |
| 3,210,366 | 10/1965 | Lang et al. | 260—296 |

WALTER A. MODANCE, *Primary Examiner.*

ROBERT T. BOND, *Assistant Examiner.*